United States Patent
Voronezhski

(10) Patent No.: US 12,195,111 B2
(45) Date of Patent: Jan. 14, 2025

(54) ROBOTIZED TRACTOR UNIT

(71) Applicant: ANT Maschinen GmbH, Dortmund (DE)

(72) Inventor: Sergei Voronezhski, Stará Lesná (SK)

(73) Assignee: ANT Maschinen GmbH, Dortmund (DE)

( * ) Notice: Subject to any disclaimer, the term of this patent is extended or adjusted under 35 U.S.C. 154(b) by 519 days.

(21) Appl. No.: 17/516,002

(22) Filed: Nov. 1, 2021

(65) Prior Publication Data

US 2023/0057081 A1    Feb. 23, 2023

(51) Int. Cl.
*B62D 53/08* (2006.01)
*B62D 59/04* (2006.01)

(52) U.S. Cl.
CPC ..... *B62D 53/0864* (2013.01); *B62D 53/0821* (2013.01); *B62D 59/04* (2013.01)

(58) Field of Classification Search
CPC ............ B62D 53/0864; B62D 53/0814; B62D 53/0807; B62D 53/0821; B62D 59/04; B62D 49/005; B62D 49/007; B60P 1/02
USPC ........... 280/438.1, 439, 441, 407.1; 180/14.1
See application file for complete search history.

(56) References Cited

U.S. PATENT DOCUMENTS

2003/0132604 A1*  7/2003  Evans ................ B62D 53/0864
                                                           280/438.1
2020/0164918 A1*  5/2020  Newton ............. B66F 9/07568

FOREIGN PATENT DOCUMENTS

EP        2052953       4/2009
WO    WO2017207978    12/2017

OTHER PUBLICATIONS

European search opinion for EP21191820.6 dated Feb. 17, 2022 (Year: 2022).*

* cited by examiner

*Primary Examiner* — Christopher B Wehrly
(74) *Attorney, Agent, or Firm* — Adam Warwick Bell; Matthew Rupert Kaser

(57) ABSTRACT

A robotized tractor unit comprises a frame and a housing, an axle mounted on the frame, at least two main wheels mounted on either side of the axle, at least one electric engine arranged to drive the wheels to rotate through transmission, a braking system, a fifth wheel, a mechanism for damping and adjusting the position of the fifth wheel, a control system, wherein the mechanism for damping and adjusting the position of the fifth wheel comprises a first and a second support elements and a first and a second independently controlled pneumatic units.

The design of the present invention provides for the reliable damping of the fifth wheel, the simplifying of its coupling to a semi-trailer, allowing for towing the semi-trailer at any design height, as well as ruling out a forward or rearward semi-trailer displacement force during lifting the fifth wheel, when the tractor unit is braked.

8 Claims, 7 Drawing Sheets

ROBOTIZED TRACTOR UNIT

The present invention relates to the field of machine-building industry, namely to vehicles intended for transporting oversize loads and heavy loads, in particular to a robotized tractor unit, which can be used, for example, to simplify the process of towing empty or loaded semi-trailers in ports, intermodal logistics hubs and storage premises.

Currently, various versions of robotized tractor units are known, which are remotely controlled by an operator using a control panel and thus eliminate the need for a certified driver.

For example, from the international patent application WO2017207978 published on Dec. 7, 2017 an autonomous vehicle for transporting semi-trailers is known comprising a chassis, a pair of wheels connected to the chassis and arranged to rotate on one axis, an electric motor driving said wheels, a control system configured to receive control signals from a remote device, which, in turn, is controlled by an operator. A fifth wheel for coupling to a semi-trailer to be transported is mounted on the chassis. Furthermore, the vehicle for transporting semi-trailers is provided with a fifth wheel lifting mechanism designed as a frame onto which said fifth wheel is mounted and the height of which can be adjusted by means of a suitable driving mechanism, such as a hydraulic cylinder or a gear mechanism. Said driving mechanism may be remotely activated by the operator using suitable means.

The disadvantage of the vehicle for transporting semi-trailers discussed is the difficulty of coupling the fifth wheel to the semi-trailer, in particular in cases when the tractor unit and the semi-trailer are on an uneven surface, that is, substantially at an angle to each other. Besides, during lifting, when the tractor unit is braked, the fifth wheel exerts a forward or rearward displacement force on the semi-trailer.

The closest prior art of the claimed invention is a robotized tractor unit described in the European patent application EP2052953 published on Apr. 29, 2009. In one of the preferred embodiments, said tractor unit comprises a frame, an axle mounted on the frame, a pair of wheels mounted on either side of the axle, an electric engine arranged to drive the wheels to rotate through transmission, a braking system, a fifth wheel, a mechanism for damping and adjusting the position of the fifth wheel and a control system. The tractor unit can be remotely controlled, e.g. by radio, by an operator. The operator, remotely acting on the related control unit, may control its manoeuvres and the modes of coupling to the semi-trailer. Said mechanism for damping and adjusting the position of the fifth wheel is designed as a pin hinged at the height of the rotation axis of the tractor unit wheels and adapted to be tilted to an angle up to 15 degrees, on which, in turn, a fifth wheel is mounted, and thus allows to extend the range of the fifth wheel positions for coupling to the object to be towed and to compensate for irregularities and slope of the surface on which the tractor unit travels when towing.

At the same time, said mechanism has a number of disadvantages. In particular, due to its design providing for the tilting of the fifth wheel, as described above, substantially by swaying the pin, it does not provide for sufficient damping of the loaded fifth wheel to smooth down the impacts. In addition, the problem of the difficulty of mounting a semi-trailer on a tractor unit remains, and it is even more acute than in the previous prior art described above. And while the first drawback can be overcome, for example, by equipping the tractor unit with an axle suspension (which, however, occupies space in the housing), the mounting of said suspension does not solve the remaining problem.

The problem to be solved by the claimed invention is to provide such a robotized tractor unit, the design of which will ensure the achievement of a technical result consisting in providing for the reliable damping of the fifth wheel, the simplifying of its coupling to a semi-trailer, allowing for towing the semi-trailer at any design height, as well as ruling out a forward or rearward semi-trailer displacement force during lifting the fifth wheel, when the tractor unit is braked.

The problem is solved by providing a robotized tractor unit comprising a frame and a housing, an axle mounted on the frame, at least two main wheels mounted on either side of the axle, at least one electric engine arranged to drive the wheels to rotate through transmission, a braking system, a fifth wheel, a mechanism for damping and adjusting the position of the fifth wheel, and a control system, wherein the mechanism for damping and adjusting the position of the fifth wheel comprises a first and a second support elements and a first and a second independently controlled pneumatic units, wherein the first end of the first support element is hinged on the tractor unit housing, and the second end of the first support element is mounted on at least one pneumatic spring of the first pneumatic unit, the first end of the second support element is hinged on the first support element between its ends, and the second end of the second support element is mounted on at least one pneumatic spring of the second pneumatic unit, wherein the fifth wheel is mounted on the second support element.

The design of the mechanism for damping and adjusting the position of the fifth wheel as described, in particular the presence of support elements mounted in a particular way and independently controlled pneumatic units, 1) provides for the reliable damping of the fifth wheel during the tractor unit movement, while eliminating the need for mounting axle suspension;
2) allows for changing the height of the fifth wheel easily if an appropriate action is exerted upon the pneumatic springs, thus allowing for the tractor unit to be driven underneath the semi-trailer, allows for it to be lifted to a predetermined height without the need to remove the semi-trailer block stops and allows for it to be withdrawn from underneath the ground-mounted semi-trailer;
3) allows for tilting the fifth wheel forward and backward if an appropriate action is exerted upon the pneumatic springs, which is especially relevant, for example, if the tractor unit, due to the surface being uneven, is inclined with respect to the semi-trailer, thereby providing for a simple and quick coupling of said fifth wheel to the semi-trailer along with a possibility of changing the height of the fifth wheel position;
4) allows for the fifth wheel, including the one loaded, to be fixed reliably in any required position (i.e. at the required height and at the required angle); and
5) allows for maintaining generally the vertical line of lifting the fifth wheel, that is, practically ruling out the displacement of the coupling point relative to the vertical axis (which will be explained in more detail below), as a result of which the braked tractor unit, during lifting the fifth wheel with a semi-trailer, will not exert forward or backward displacement forces on the latter.

The term "robotized" as used herein means that a tractor unit communicates with an operator being outside the tractor unit directly by receiving commands from him (manual control) and/or is equipped with a hardware-software complex driving the tractor unit along a certain predetermined trajectory, and requires no certified driver.

Most preferably, the mounting surface of the second support element in the lower position of the pneumatic springs of both pneumatic units lies in a plane parallel to the mounting surface of the tractor unit.

The support elements are structural elements, preferably made of metal, on which the fifth wheel rests directly (the second support element) or indirectly (the first support element). Most preferably, the first support element is U-shaped, wherein the free ends of its longitudinal elements (the first end of the first support element) are hinged on the corresponding axes on the tractor unit housing, and the transverse element (the second end of the first support element) is a platform resting on one or more pneumatic springs of the first pneumatic unit. In this case, the second support element is designed as a plate located between two longitudinal elements of the U-shaped first support element and is hinged with its first end in the area of the inner edge of the transverse element in the form of a platform of said U-shaped first support element, and rests with its second end on one or more pneumatic springs of the second pneumatic unit. Meanwhile, it should be appreciated by a person skilled in the art that other implementation variants of these features are possible within the scope of the present invention.

The most preferable is the use of a truck rear axle in the design of the tractor unit as claimed. In this case, all rear axle systems are involved, including wheels and braking system (both primary and parking), wherein, as a rule, modern manufacturers equip their cargo vehicles with pneumatic braking systems. This solution ensures reliability and high repairability of the tractor unit (due to the use of standard serial products), as well as its high load-carrying capacity. In this case, since the tractor unit imitates the truck's braking system operation algorithm, it is possible to connect the semi-trailer braking system as well to the tractor unit. When connecting a semi-trailer, the use of a pneumatic system allows for releasing the brake of the semi-trailer and utilizing its primary braking system for emergency braking. This whole complex provides for the highest possible safety both during movement of an empty tractor unit and when towing a loaded semi-trailer. In addition, since, in view of the above, the primary braking systems of the tractor unit and the semi-trailer are designed for braking at high speeds of trailer trains, the operation of such a system at speeds up to 6 km/h, i.e. at the speeds that are usually used when towing by means of robotized tractor units, practically does not wear it out and makes it long-lasting.

Thus, most preferably, the brake system of the claimed tractor unit, in the same way as the mechanism for damping and adjusting the position of the fifth wheel, is pneumatic, and their air circuits (i.e. the air circuits of the pneumatic units and the braking system) are separated to exclude their mutual influence on each other and, accordingly, to increase the reliability of the whole tractor unit design, and comprise a common compressor. This solution is simple and inexpensive, and is made possible on condition that the pneumatic springs and a braking system operating in the same pressure range are used. For example, in the event that a standard truck braking system, as described above, characterized by the operation pressure of 6-8 atm, is used in the claimed tractor unit design, standard pneumatic springs from the suspension of serial buses can be used in the mechanism for damping and adjusting the position of the fifth wheel of said tractor unit. The size of pneumatic springs and their number in each case is determined by the sum of the characteristics of availability (for example, from serial buses) and the lifting force margin at a fixed pressure in the air circuit. In the most preferred embodiment, the tractor unit as claimed uses two pneumatic springs in each of the pneumatic units. Furthermore, both air circuits (of the pneumatic units and of the braking system) may be equipped with standard receivers from the truck braking system, which allows them to operate for a while, even if the compressor fails, and, correspondingly, increases the reliability of the claimed invention as well.

Preferably, the tractor unit as claimed comprises a steering wheel at the front. Said steering wheel is mounted rotatably at angles up to 45° relative to the axis of the tractor unit straight movement. Taking into account the geometry of the arrangement of the two main wheels mounted on either side of the axle and of the swivel wheel mounted in the front of the tractor unit, when the swivel wheel is deflected by a limit angle of 45°, the turning radius of the tractor unit is similar to a corresponding radius when one of the main wheels is fully braked. This provides for a very small turning radius of the tractor unit. Most preferably, the steering wheel is driven by a separate servomotor. This provides for a quick turn of the steering wheel by an angle set by the control system, which allows for very accurately providing the required turning radius of the tractor unit, including in the automatic mode.

In the most preferred embodiment of the present invention, the view from above of the tractor unit has a rounded-corner rectangle contour. Such a variant is possible thanks to designing a tractor unit housing of an appropriate shape and arrangement of all the structural elements of the tractor unit within limits of said housing and above it. In such a case, the fifth wheel is mounted on the housing in the area of intersection of the conventional diagonals of said rectangle, i.e. in the middle of the housing. The width and the length of the latter, i.e. the outline dimensions are most preferably 2.5 m and 3.1 m respectively. The combination of the above-described structural properties of the tractor unit as claimed allows it to be located fully under a semi-trailer of standard dimensions when moving forward or backward, while practically not exceeding the limits of the semi-trailer dimensions when rotated and, thus, minimizing the possibility of catching on nearby objects, for example, other semi-trailers, equipment or walls.

Apart from other advantages described above, designing a housing shaped as discussed allows for other structural elements of the tractor unit to be arranged in the areas of its four corners (in the corner compartments) and in the side areas (in the side compartments). Such elements are selected depending on the configuration of the tractor unit and can be, for example, two batteries, control electronics and a compressor. Said areas are easily accessible for the installation of the necessary equipment and maintenance of the tractor unit, which, in turn, greatly simplifies the assembly of the tractor unit during production and its operation, as well as increases its overall repairability. So, for example, easy access to the electric engine system and the control system is provided through the rear cover. There can also be located a mechanism for disengaging the engine from the axle to ensure towing of the tractor unit. Moreover, the compartments can be designed for any tractor unit equipment to be arranged in them, thereby using the free space within the housing in the most efficient way possible.

Preferably, the tractor unit as claimed comprises block stops of the second support element, mounted on its sides on the tractor unit housing. Said block stops additionally prevent the mechanism for damping and adjusting the position of the fifth wheel from sidesway when a loaded tractor unit is rotated.

A control system, used in the tractor unit as claimed may comprise an electric engine controller, a control unit connected to the electric engine controller, the mechanism for damping and adjusting the position of the fifth wheel and the braking system, a steering wheel rotation mechanism controller, main wheels rotation control sensors, telemetry sensors for monitoring air pressure within the air circuits of the pneumatic units and the braking system, engine (electric motor and servomotor) and battery temperature sensors, voltage sensors for batteries and their emergency protection systems, a radio frequency transceiver connected to the control unit, as well as a computer for monitoring all the tractor unit operation systems, wherein the operation principle of such a system is known to the persons skilled in the art.

The claimed invention is explained in more detail using the following figures:

Figure 1:
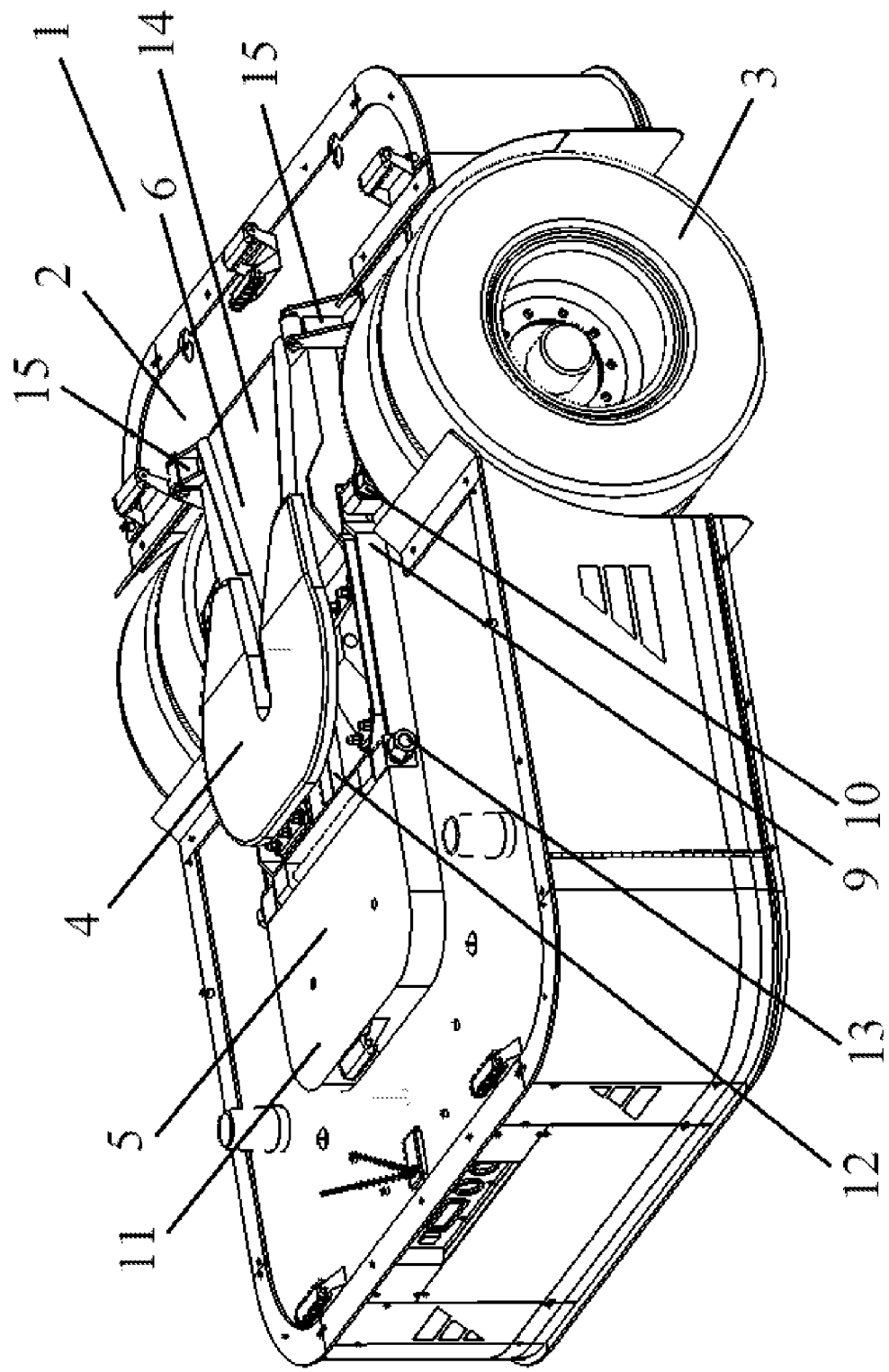
FIG. 1 is a general view of one of the most preferred embodiments of the claimed tractor unit.

FIG. 1 shows a general view of a robotized tractor unit 1. The tractor unit 1 comprises a rounded corner housing 2 comprising a frame, an axle mounted on the frame, two main wheels 3 mounted on either side of the axle, an electric engine arranged to drive the wheels 3 to rotate through transmission, a braking system, a fifth wheel 4, a mechanism for damping and adjusting the position of the fifth wheel 4 and a control system. The structural elements of the claimed tractor unit 1, not designated with reference numerals, are located inside the housing 2 and, accordingly, are not visible in FIG. 1.

Said mechanism for damping and adjusting the position of the fifth wheel 4 comprises a first support element 5 and a second support element 6 and a first and a second independently controlled pneumatic units. The first pneumatic unit comprises two pneumatic springs 7, and the second one comprises two pneumatic springs 8. Since the pneumatic springs of both pneumatic units are in their lower position in the figure viewed, they are not visible in FIG. 1, but they are designated in FIG. 4.

Figure 4:
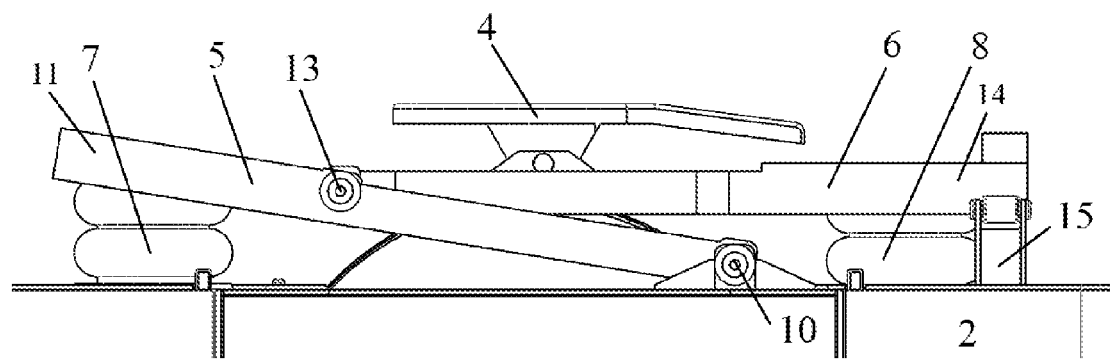
FIG. 4 is a side view of one of the most preferred embodiments of the mechanism for damping and adjusting the position of the fifth wheel of the tractor unit as claimed in the upper position of the pneumatic springs of both pneumatic units.

The first support element 5 is designed to be U-shaped (i.e. it comprises two longitudinal and one transverse elements), wherein its first end 9 in the form of the free ends of its longitudinal elements is hinged on the corresponding axes 10 on the housing 2 of the tractor unit 1, and its second end 11 in the form of a transverse element is a platform resting on pneumatic springs 7 of the first pneumatic unit (see FIG. 4). And the second support element 6 is designed as a plate located in part between two longitudinal elements of the U-shaped first support element 5 and is hinged with its first end 12 in the area of the inner edge of the platform, in the form of which the second end 11 of the first support element 5 is made (i.e. in the area between the ends 9 and 11 of the first support element 5) on the corresponding axes 13, and rests with its second end 14 on the pneumatic springs 8 of the second pneumatic unit (see FIG. 4). The block stops 15 of the second support element 6 are installed on the housing 2.

It is seen that the fifth wheel 4 is mounted on the second support element 6.

Figure 2:
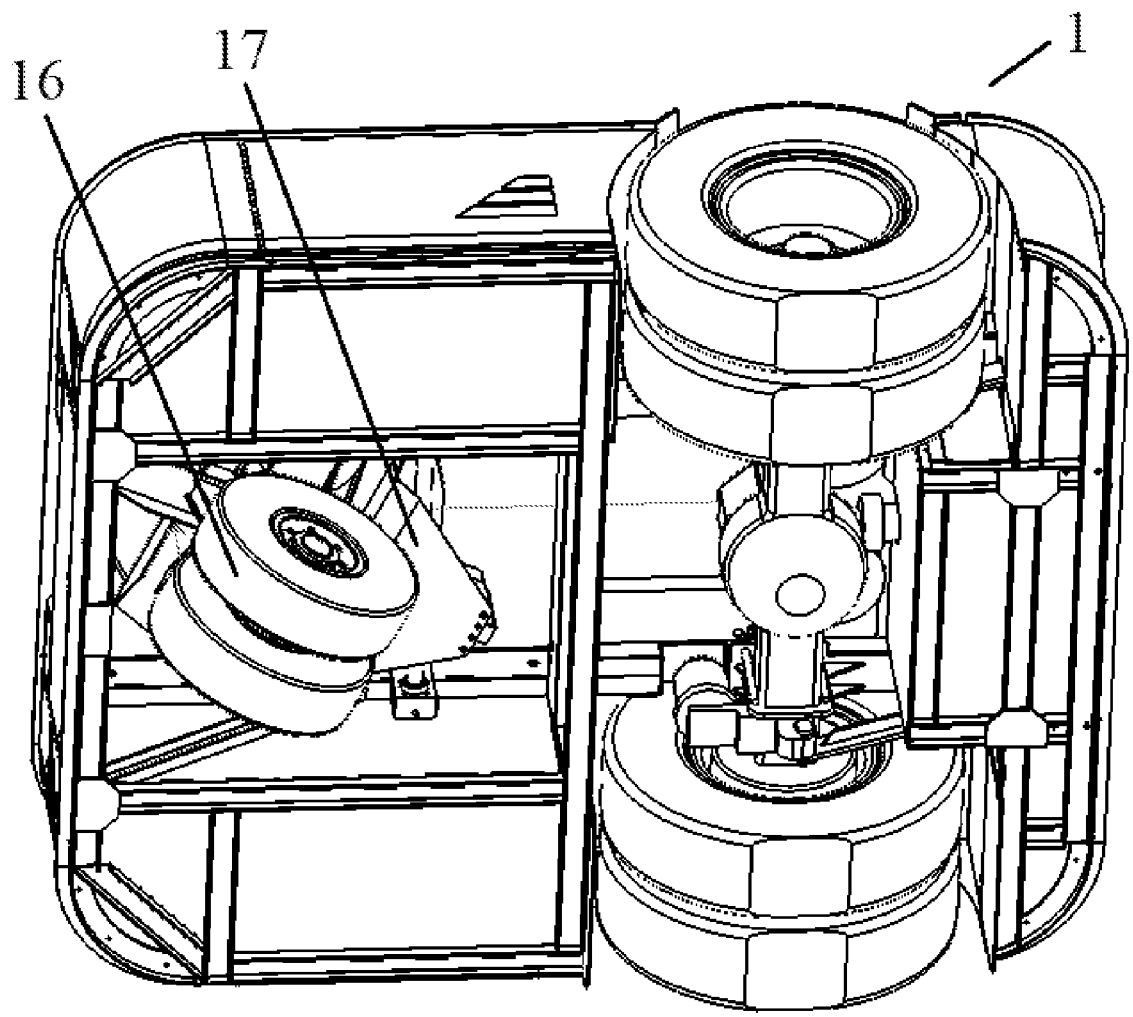
FIG. 2 is a bottom view of one of the most preferred embodiments of the claimed tractor unit.

FIG. 2 shows a bottom view of the tractor unit 1. It is seen that said tractor unit 1 comprises steering wheel 16 mounted in the front on a rotation mechanism 17.

Figure 3:
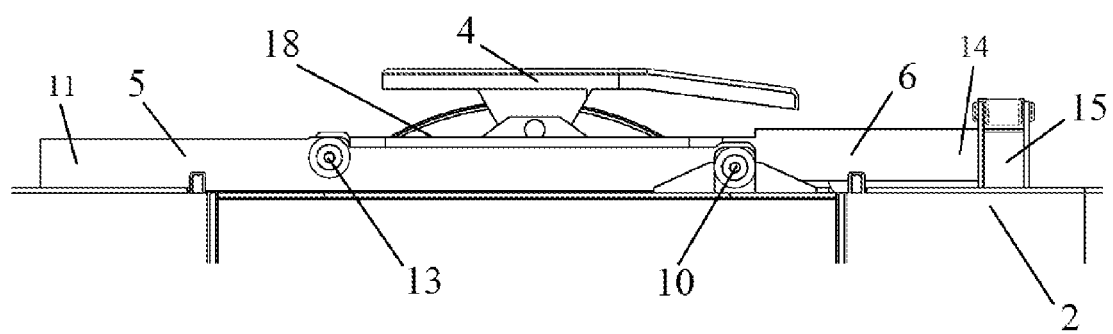
FIG. 3 is a side view of one of the most preferred embodiments of the mechanism for damping and adjusting the position of the fifth wheel of the tractor unit as claimed in the lower position of the pneumatic springs of both pneumatic units.

FIG. 3 shows a side view of the mechanism for damping and adjusting the position of the fifth wheel 4 of the tractor unit 1 as claimed in the lower position of the pneumatic springs 7 and 8 of both pneumatic units. In the indicated position, the springs 7 and 8 are almost completely located inside the housing 2 and are not visible in FIG. 3 viewed. In what follows, the structural elements of the tractor unit 1, which are identical to those shown in FIG. 1, are designated with corresponding reference numerals.

It can be seen that in the lower position of the pneumatic springs 7 and 8, i.e. in such a position when the fifth wheel 4 takes its lowermost position, and the tractor unit 1, correspondingly, is characterized by a minimum height, the first 5 and the second 6 support elements are somewhat folded, visually forming one platform, and the mounting surface 18 of the second support element lies in a horizontal plane parallel to the upper surface of the housing 2 of the tractor unit 1 (based on the fact that the tractor unit 1 is mounted on a completely flat surface, the tilt angle of which equals 0°).

FIG. 4 shows a side view of the mechanism for damping and adjusting the position of the fifth wheel 4 of the tractor unit 1 as claimed in the upper position of the pneumatic springs 7 and 8 of both pneumatic units. In said position, the springs 7 and 8 are almost completely located over the housing 2.

Figure 5:
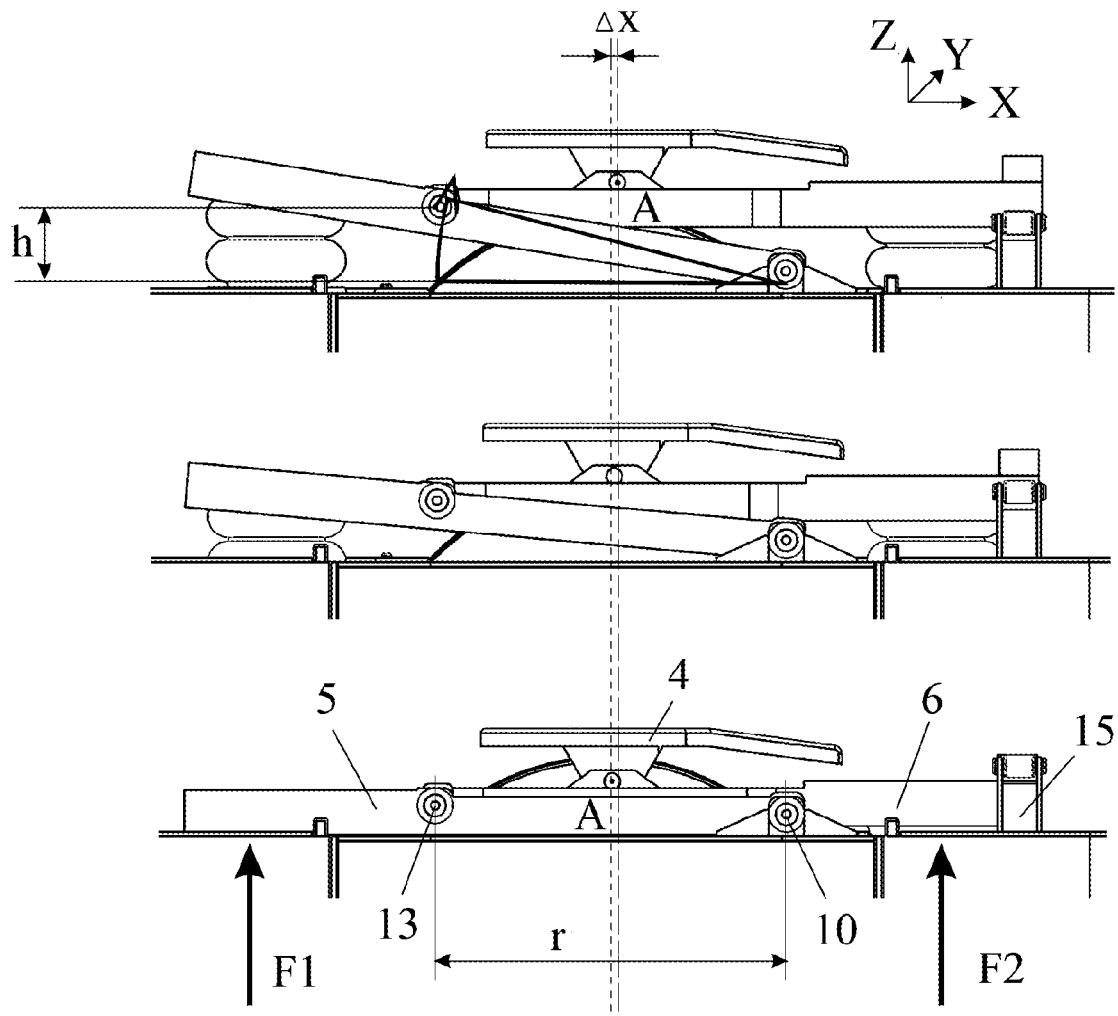
FIG. 5 illustrates the sidesway of the fifth wheel during its upward movement according to one of the most preferred embodiments of the claimed tractor unit.

FIG. 5 illustrates displacement of the fifth wheel 4 along axis X during its upward movement along axis Z using the example of point A. It is seen in the figure that when the forces F1 and F2 are applied to the support elements by the corresponding pneumatic springs and, as a result of this, when the fifth wheel is lifted to the maximum possible height h, the position of point A will only slightly displace in space along axis X by a distance Δx (due to the movement of axis 13, which is illustrated in the upper image with an arrow, along a circle with a radius r equal to the distance between axes 10 and 13).

So, for example, when the fifth wheel 4 moves along axis Z to a height from 0 to 270 mm with a radius r equal to 790 mm, the displacement Δx of point A along axis X will be 12 mm.

Thus, the displacement of point A, and, consequently, of the fifth wheel 4 relative to the vertical axis is practically excluded, and, as a result, the braked tractor unit 1, during lifting the fifth wheel 4 with a semi-trailer, will not exert any forces on the semi-trailer, i.e. will not affect the loads occurring in the semi-trailer.

Axes 10 and 13, as well as the block stops 15 rigidly fix the fifth wheel 4 and do not allow for its displacement along axis Y even when high lateral forces are applied to it.

Figure 6:
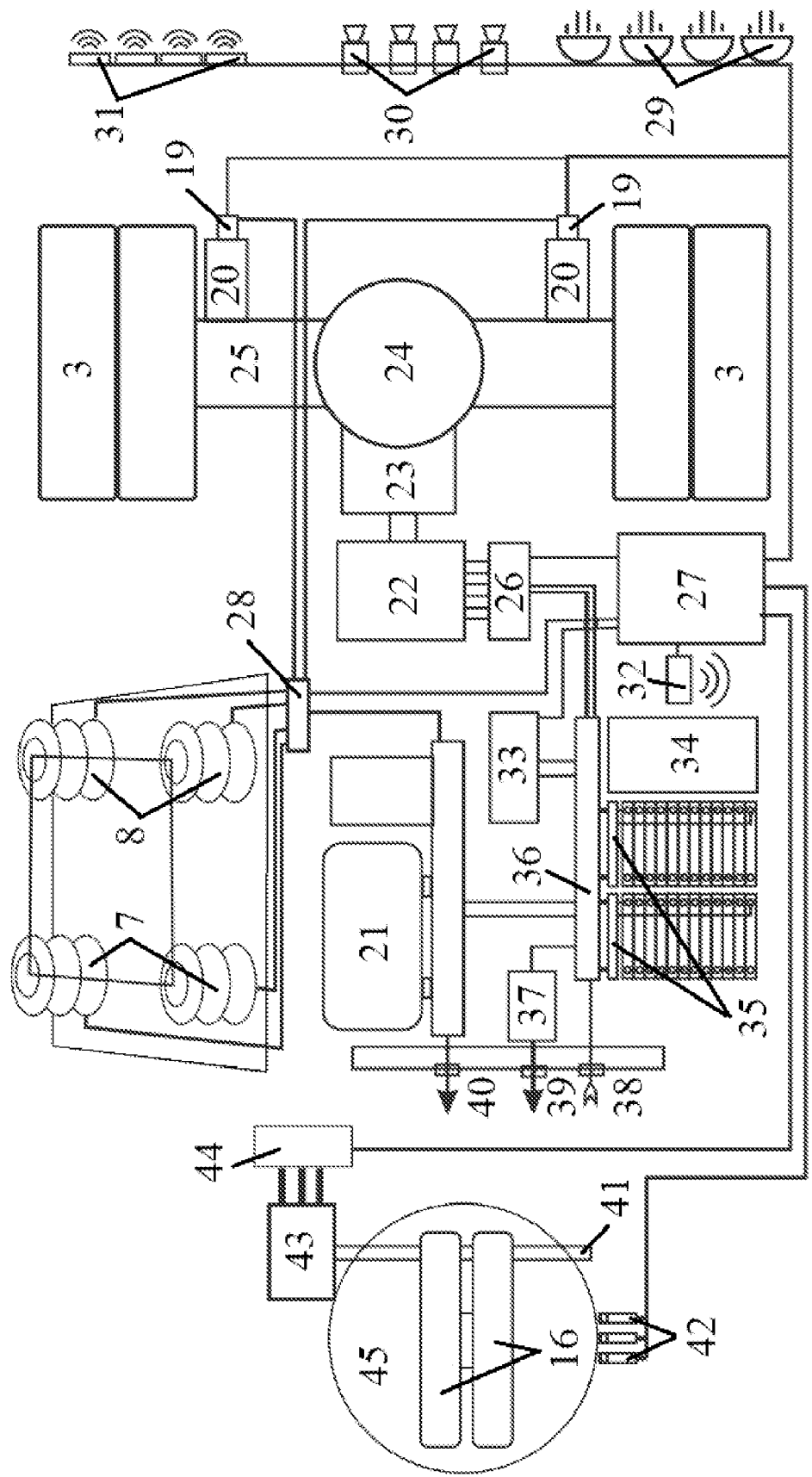
FIG. 6 is a schematic representation of the structural elements of the tractor unit as claimed and the relationships therebetween.

FIG. 6 is a schematic representation of the structural elements of the tractor unit 1 as claimed and the relationships therebetween.

It is seen in the diagram that the first and the second pneumatic units comprising pairs of pneumatic springs 7 and 8 respectively, as well as the braking system represented by the pneumatic valves 19 and the pneumatic cylinders 20 comprise a common compressor 21.

In addition, the diagram shows an electric engine 22, which, with the help of an intermediate gear 23 and a differential 24, drives the wheels 3 mounted on the axle 25 to rotate.

The control system comprises an electric engine 22 controller 26; a control unit 27 connected to the electric engine 22 controller 26, a pneumatic distributor 28, pneumatic valves 19, as well as to the exterior lighting system 29, video cameras 30 and parking sensors 31. Besides, the control system comprises a radio frequency transceiver 32 connected to the control unit 27 and to the exterior lighting system 29.

The diagram also shows a power supply unit 33 of the control unit 27, an additional seat 34 for the battery, a battery controller 35, a battery protection and switching unit 36 and a voltage converter 37.

The reference numerals 38, 39 and 40 designate a charger connector, a 24 V output and a compressed air output, respectively.

The diagram also shows a steering wheel 16, a driving screw 41, three end switch-sensors 42 (the first one is for the leftmost position of the steering wheel 16, the second one is for the position of the steering wheel 16 when moving straight ahead, the third one is for the rightmost position of the steering wheel 16), a servomotor 43 driving the steering wheel 16, a controller 44 for controlling the servomotor 43, a rotating unit 45 with a sliding nut that moves along the driving screw 41 rotated by the servomotor 43.

Figure 7:
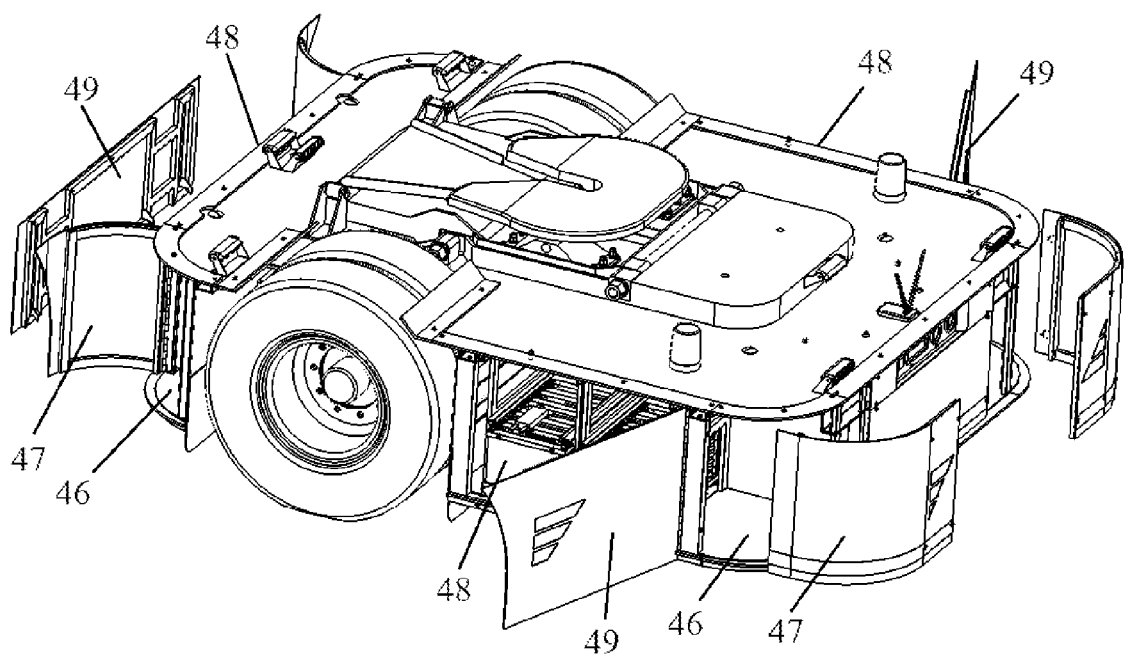
FIG. 7 is a general view of the tractor unit of FIG. 1 with open compartments.

As seen in FIG. 7, in the areas of the four corners of the tractor unit 1 housing 2, four corner compartments 46 may be provided, accessible by means of covers 47, and in the areas of the housing 2 three sides, three side compartments 48 may be provided, accessible by means of covers 49. The covers 47 and 49 are constituent parts of the housing 2. Said compartments 46 and 48 may receive structural elements of the tractor unit 1, such as, for example, batteries, compressor 21, etc.

Figure 8:
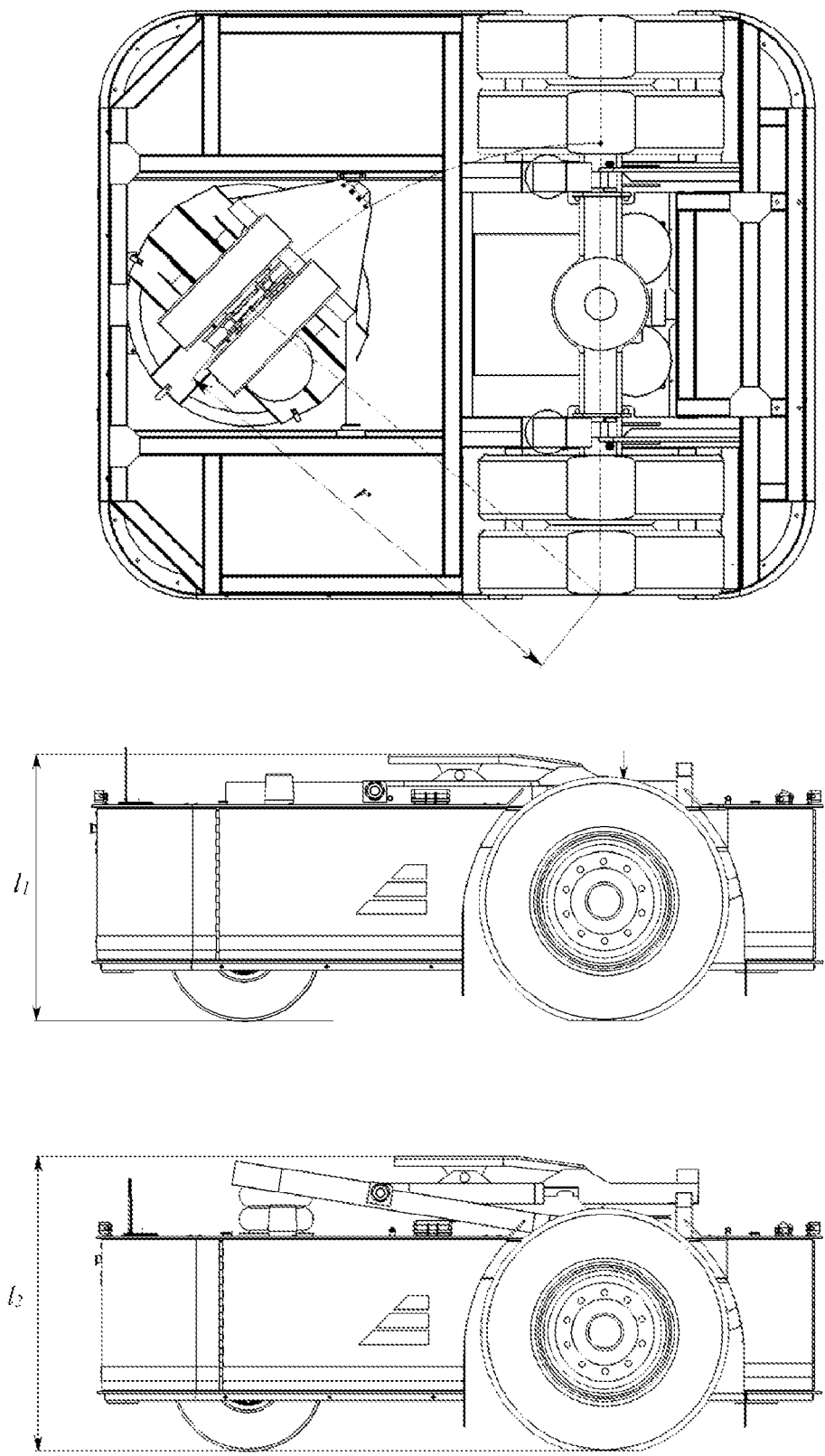
FIG. 8 shows a side view and a bottom view of one of the most preferred embodiments of the claimed tractor unit with indicated dimensions.

According to FIG. 8, illustrating the side view and the bottom view of one of the most preferred embodiments of the tractor unit as claimed, the turning radius r of the tractor unit is 1.95 m, the height $l_1$ of the tractor unit when the fifth wheel is fully lowered is 1.13 m (which allows to drive underneath almost any standard truck and to be engaged with it), and the height $l_2$ of the tractor unit when the fifth wheel is fully lifted is 1.3 m.

The tractor unit 1 as claimed operates as follows.

If the semi-trailer needs towing, the tractor unit 1 is driven underneath the semi-trailer mounted on the supports, after which the fifth wheel 4 is mounted at the required height, thus achieving coupling to the semi-trailer and lifting it to the required towing height. The fifth wheel 4 can be pre-tilted forward or backward at an angle of up to 15° in order to simplify coupling to the semi-trailer. The above position adjustment of the fifth wheel 4 is carried out through an appropriate mechanism. When directly towing the semi-trailer on uneven surfaces using the mechanism for damping and adjusting the position of the fifth wheel 4, said mechanism 4 is damped. After the semi-trailer arriving at its destination, the fifth wheel 4 of the tractor unit 1 is lowered and, thus, the semi-trailer is mounted on the ground, after which the tractor unit 1 can be freely withdrawn from underneath the semi-trailer. The tractor unit 1, i.e. all its systems and mechanisms necessary for the performance of its functions, is driven by an operator using a remote control acting on the control unit 25 through the radio frequency transceiver device 32.

Thus, the invention as claimed is a robotized tractor unit, the design of which ensures the achievement of a technical result consisting in providing for the reliable damping of the fifth wheel, the simplifying of its coupling to a semi-trailer, allowing for towing the semi-trailer at any design height, as well as ruling out a forward or rearward semi-trailer displacement force during lifting the fifth wheel, when the tractor unit is braked.

It should be appreciated that the claimed tractor unit, as defined in the appended claims, is not necessarily limited to the specific features and embodiments, including dimensions or specific structural elements described above. On the contrary, the specific features and embodiments described above are disclosed as examples implementing the claims, and other equivalent features may be covered by the claims of the present invention.

The invention claimed is:

1. A robotized tractor unit comprising:
   a frame and a housing,
   an axle mounted on the frame,
   at least two main wheels mounted on either side of the axle,
   at least one electric engine arranged to drive the wheels to rotate through transmission,
   a braking system,
   a fifth wheel,
   a mechanism for damping and adjusting the position of the fifth wheel,
   a control system,
   wherein the mechanism for damping and adjusting the position of the fifth wheel comprises a first and a second support elements and a first and a second independently controlled pneumatic units, wherein
   the first end of the first support element is hinged on the tractor unit housing, and the second end of the first support element is mounted on at least one pneumatic spring of the first pneumatic unit,
   the first end of the second support element is hinged on the first support element between its ends, and the second end of the second support element is mounted on at least one pneumatic spring of the second pneumatic unit,
   wherein the fifth wheel is mounted on the second support element.

2. The tractor unit of claim 1, wherein a mounting surface of the second support element in a lower position of the pneumatic springs of both pneumatic units lies in a plane parallel to a mounting surface of the tractor unit.

3. The tractor unit of claim 1, wherein the braking system is pneumatic, and a air circuits of the pneumatic units and the braking system are separated and comprise a common compressor.

4. The tractor unit of claim 1, further comprising a steered wheel mounted rotatably at angles up to 45° relative to a axis of the tractor unit straight movement.

5. The tractor unit of claim 1, wherein a view from above the tractor unit has a rounded-corner rectangle contour.

6. The tractor unit of claim 1, wherein the fifth wheel is mounted on the housing at an intersection of the conventional diagonals of the rectangle.

7. The tractor unit of claim 1, wherein the second support element further comprises block stops mounted on the housing.

8. The tractor unit of claim 1, wherein the control system comprises an electric engine controller,
- a control unit connected to the electric engine controller, the mechanism for damping and adjusting the position of the fifth wheel and the braking system,
- a steered wheel rotation mechanism controller, main wheels rotation control sensors,
- telemetry sensors for monitoring air pressure within air circuits of the pneumatic units and the braking system,
- temperature sensors for the electric engine, servomotor and batteries,
- voltage sensors for the batteries and emergency protection systems of the batteries, a radio frequency transceiver connected to the control unit.

\* \* \* \* \*